April 11, 1967  A. J. BALFOUR ET AL  3,313,180
DRIVE MECHANISM
Filed June 8, 1964  2 Sheets-Sheet 1

INVENTORS
ARTHUR J. BALFOUR
RICHARD K. BRUBAKER
BY
William David,
Hoffmann & Yount
ATTORNEYS April 11, 1967    A. J. BALFOUR ET AL    3,313,180
DRIVE MECHANISM Filed June 8, 1964    2 Sheets-Sheet 2

INVENTORS
ARTHUR J. BALFOUR
RICHARD K. BRUBAKER
BY
Williams, David,
Hoffmann & Yount
ATTORNEYS 3,313,180
DRIVE MECHANISM
Arthur J. Balfour, Marshall, and Richard K. Brubaker, Warren, Mich., assignors to Eaton Yale & Towne Inc., a corporation of Ohio
Filed June 8, 1964, Ser. No. 373,187
4 Claims. (Cl. 74—711)

The present invention relates to a drive mechanism and particularly to a differential drive mechanism, referred to commonly as a limited slip differential, and which is frequently used in vehicle axles and is operable to minimize slippage of the vehicle wheels.

Differential drive mechanisms of the limited slip type are known to include at least one differential side gear located in a differential casing. An axial thrust or loading of the side gear results in activation of a friction clutch means associated with the side gear and the differential casing to retard rotation of the side gear relative to the casing. The friction clutch means comprises first friction discs drivingly connected to the side gear and second friction discs drivingly connected to the casing and which are effective to drivingly interconnect the casing and gear in response to the axial loading. The Russell United States Patent No. 3,052,137 shows such a limited slip differential drive mechanism. Such differential mechanisms have been subject to so-called "stick-slip" which occurs between the above-noted friction discs. This "stick-slip" causes chatter or noise due to mechanical vibration of the friction discs. Moreover, it greatly reduces the life of the differential drive mechanism. It has been discovered that this objectionable "stick-slip" can be minimized and greatly reduced by disposing between the friction discs a material providing a high static coefficient of friction and a high dynamic coefficient of friction which rises as slip speed between the discs increases.

Accordingly, the principal object of the present invention is the provision of a new and improved, compact, simple and highly reliable limited slip differential drive mechanism constructed so as to minimize "stick-slip" and provide for efficient operation, a long life and a drastic reduction in chatter of the friction discs at low slip speeds.

A further object of the present invention is the provision of a new and improved differential drive having a friction clutch actuated upon axial loading of a side gear of the differential, and wherein a drive member is located between adjacent friction discs of the friction clutch and drivingly interconnects the friction discs and has a friction drive connection with at least one adjacent disc and provides a rising dynamic coefficient of friction therebetween at low slip speeds and, thus, drastically reduces chatter between the friction discs.

A still further object of the present invention is the provision of a new and improved differential drive mechanism having a friction clutch which includes at least one steel disc splined to a differential side gear and another steel disc splined to the casing of the differential and which are drivingly interconnected upon axial loading of the side gear, and wherein an asbestos drive member is interposed between the steel discs of the friction clutch and has a frictional drive connection with each of the discs.

Another object of the present invention is the provision of a new and improved differential drive mechanism having a friction clutch with friction discs splined to a side gear of the differential and other friction discs splined to the casing of the differential, and wherein asbestos disc members are interposed between the discs of the friction clutch and float therebetween and drivingly connect adjacent friction discs and are effective to reduce chatter therebetween.

Further objects and advantages of the present invention will be apparent from the following detailed description of the preferred embodiment thereof made with reference to the accompanying drawings forming a part of this specification and wherein.

Figure 2:
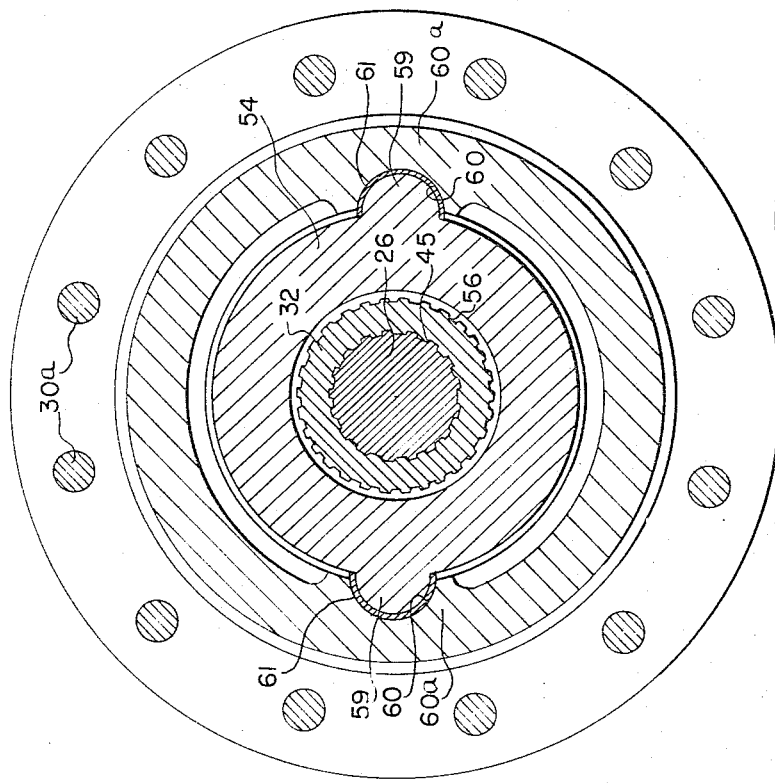
FIG. 2 is a transverse sectional view taken through the mechanism of FIG. 1, approximately along the section line 2—2 of FIG. 1.
Figure 1:
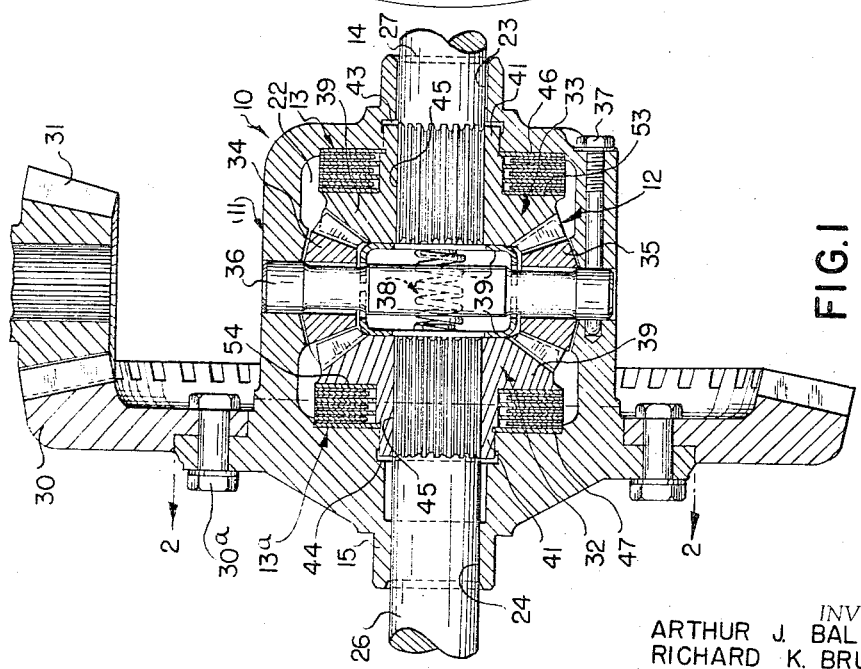
FIG. 1 is an axial sectional view taken through a differential gear mechanism embodying the present invention.
Figure 3:
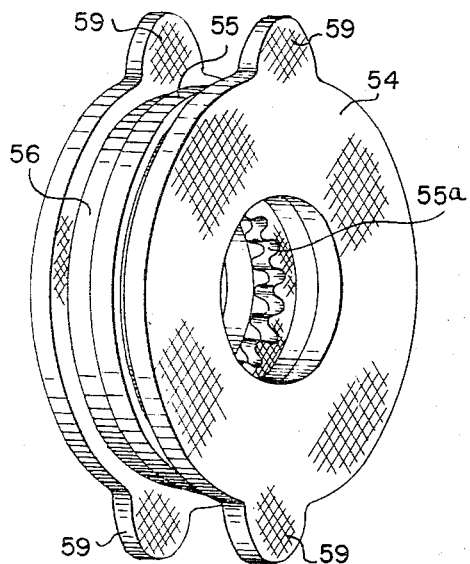
FIG. 3 is a perspective view of a portion of the mechanism shown in FIG. 1.
Figure 4:
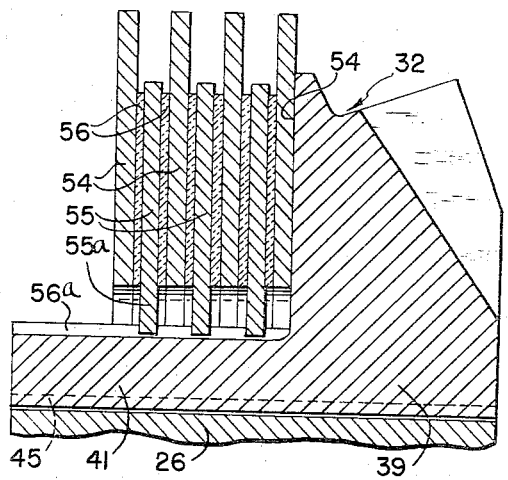
FIG. 4 is an enlarged fragmentary sectional view of a portion of the mechanism shown in FIG. 1.
Figure 5:
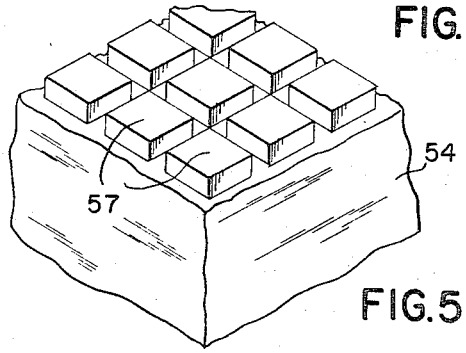
FIG. 5 is a perspective view of a portion of the mechanism shown in FIG. 1.

The invention provides a new and improved differential drive mechanism of the limited slip type. The preferred embodiment of the invention comprises a differential gear mechanism 10 which can be used for various purposes but which is especially suitable for vehicle axle use. The differential mechanism 10 comprises, in general, a rotatable casing 11, a differential gear train 12, and friction clutch means 13, 13a associated with gears of the gear train and actuated thereby to retard rotation thereof relative to the casing and minimize traction wheel slippage, as will be explained hereinafter. While the differential mechanism 10 includes two clutch means, a single such clutch may be used in certain applications.

The casing 11 is provided with support portions 14 and 15 adapted to be received in bearings of a supporting structure, such as an axle housing (not shown), by which the casing is rotatably supported. The casing 11 is here shown, by way of example, as comprising a one-piece member open on its opposite sides to facilitate assembly and on opposite ends of which the support portions 14 and 15 are formed. The casing 11 is hollow and defines a gear chamber 22 in which the gear train 12 and the friction clutch means 13, 13a are located.

The opposite ends of the casing 11 are provided with openings 23, 24 extending through the portions 14, 15, respectively, and which openings are disposed in an aligned relation on a common axis which is also the rotation axis of the casing 11. The axial openings 23 and 24 receive or accommodate the driven or power output shaft means, which is here represented by axle shafts 26, 27 whose outer ends are connected with traction wheels or the like (not shown) and whose inner or adjacent ends are connected with the gear train 12, as will be explained hereinafter.

The differential mechanism 10 also includes a conventional ring gear 30 extending around and mounted on the casing 11 by means of the connecting bolts 30a. A drive pinion 31 is here shown in mesh with the ring gear 30 and represents the power input means of the differential mechanism 10.

The gear train 12 comprises a pair of bevel-type side gears 32, 33 and a group of bevel-type idler or pinion gears, in this case, two such gears 34, 35 disposed between and in meshed engagement with the side gears 32, 33 for connecting the latter. The pinions 34, 35 are rotatably supported in the casing 11 as by means of a pinion shaft 36 extending across the gear chamber 22 and secured in the casing by a suitable anchor pin 37 extending through the pinion shaft transversely thereof. The side gears 32, 33 are biased in opposite axial directions along the common axis by a spring preload means 38. The spring preload means 38 may take any form and for some applications may be eliminated. The spring preload means 38 shown comprises coil spring means located on opposite lateral sides of the pinion shaft 36. The opposite ends of the coil spring means are positioned in spring retainer caps 39' which engage the side gears 32, 33.

The side gears 32, 33 and the pinion gears 34, 35 are, in the preferred embodiment, all bevel gears of a conventional form, so far as the teeth thereof are concerned, and the tooth profiles are of a conventional shape having pressure-angle values coming within the usual range of such values. The side gears 32, 33, while in the preferred embodiment comprise bevel gears, may take other known forms, and each of the gears 32, 33 comprises an annular body 39 having teeth formed thereon and a central hollow sleeve or hub 41 connected with the body and extending coaxially with the axis of rotation of the side gears 32, 33. The casing 11 is provided with hollow annular thrust bearing portions or axial sockets 43, 44 and the side gears 32, 33, respectively, are rotatably supported in the casing by having their hubs 41 rotatably received in these hollow bearings. The side gears 32, 33 are provided with splines 45 in the hub openings thereof and which are engaged by corresponding splines formed on the inner ends of the axle shafts 26, 27 for connecting such shafts with the side gears.

The casing 11 is also provided with annular thrust portions 46, 47 which surround the hollow bearing portions 43, 44, respectively, and are here represented as being flat, rigid end wall surfaces formed on these casing sections and lying in parallel planes extending transversely of the rotation axis in a substantially perpendicular relation to the latter. These annular thrust portions may take other forms and receive or absorb the outward axial thrust of the side gears 33, 32 which results from the pressure-angle torque load reaction of the meshed teeth of the gear train 12 and also receive the thrust due to the preload spring means 38.

The body 39 of the side gear 33 is provided with an annular thrust portion 53 located in an axially opposed relation to the annular thrust portion 46 and is here shown as being an annularly extending, flat radial surface surrounding the hub 41. The body 39 of the side gear 32 is also provided with an annular thrust portion 51 located in an axially opposed relation to the thrust portion 47 and is here shown as being an annularly extending, flat radial surface surrounding the hub 41 of gear 32.

The friction clutch means 13 is a pressure-responsive clutch means and is located between the annular thrust portions 46, 53 of the casing and the side gear 33, respectively, so that outward axial thrust or loading of this side gear in the casing 11, in response to the above-mentioned pressure-angle torque reaction from the meshed teeth of the gear train, and the preload means will cause the clutch to be actuated to an engaged or energized condition. The clutch 13a is also a pressure-responsive clutch means and is located between the thrust portions 47, 54 and is actuated to an energized condition by axial force of the gear 32.

The clutch means 13 and 13a are of identical construction and therefore only clutch means 13a will be described hereinbelow in detail and similar reference characters will be used to designate corresponding parts of each clutch means. The clutch means 13a is a disc-type friction clutch having a first group of friction discs or plates 54 drivingly connected with the casing 11, a second group of friction discs or plates 55 drivingly connected with the side gear 32 and a group of drive members 56 which are interleaved or interposed between the discs 54, 55. All of the discs are loaded axially, as will be described hereinbelow, to actuate the clutch 13a to an energized condition, and the discs are held at all times with their radially extending surfaces in engagement.

The connection of the clutch discs 54 with the casing 11 is provided by circumferentially spaced, radially extending anchorage lugs or ears 59 which project from the outer periphery of each of the discs 54. Though other methods of retaining discs might be used, each of the discs is provided with two such anchorage lugs 59 in a diametrically opposed location, as best seen in FIG. 2. The lugs 59 project into correspondingly located openings or recesses 60 in a casing section 60a of the casing 11 to cooperate with the adjacent portions of the casing to hold the discs 54 against rotation relative to the casing 11. To prevent gouging or abrading of the portions 60a of the casing 11 by the lugs 59, inserts or liner members 61 are positioned in the openings 60 against which the rotative thrust reaction of the clutch disc 54 is taken. The inserts 61 are of a hollow form and of a U-like shape and are disposed in the openings 60 so as to extend in embracing relation to the lugs 59 of the clutch disc 54. The lugs 59 have an arcuate configuration providing an outer convex surface 62, and the U-shaped members 61 have a complementary curved recess therein and closely engage the lugs 59. This provides a great area of contact between the lugs and the liner members 61 and provides for relatively great distribution of the driving forces therebetween and minimizes wear of these parts which would be present if the driving forces were concentrated in a small area.

Each of the discs 55 which are drivingly connected with the hub portion 41 of the gear 32 is provided with a plurality of radial teeth 55a which engage with an annular group of splines 56 extending along hub portion 41 and provides a spline connection therebetween. The spline connections of the clutch discs 55 with portion 41 and the connections of the clutch discs 54 with the casing 11 permit sufficient axial loading of the clutch discs in response to outboard axial thrust of the side gear 32 to produce the above-mentioned engaged or energized condition of the clutch 13a.

The drive members 56 which are interposed between the friction discs 54 and 55 drivingly interconnect these friction discs and are preferably disc members which extend concentrically with the discs 54 and 55. The discs or drive members 56 have opposite radially extending surfaces which engage with adjacent radially extending surfaces of the friction discs 54 and 55 and which radially extending surfaces provide frictional areas of contact and a frictional driving connection between the drive members 56 and the friction discs 54, 55. The drive members 56 are supported in a position between the drive discs 54 and 55 in a floating manner. The thickness of the drive members 56 may vary so as to provide the proper overall axial dimension for the friction clutch 13a and each drive member 56 thus performs a shim function in that the proper thickness of the drive member 56 may be selected in order to provide the proper preload and overall dimension of the friction clutch 13a and thus eliminate the need for separate shims.

The material of which the disc members 54, 55 and 56 are made provides for a rising coefficient of friction between the adjacent disc members at low slip speeds; preferably, the disc members 54 and 55 which are splined to the casing 11 and the side gear 32, respectively, are made of steel. Moreover, the radially extending friction discs 54 and 55, are preferably patterned as disclosed in Russell Patent No. 3,073,424. The pattern in the present instance, as shown in the drawings, comprise a plurality of projecting lands 57 which extend axially from the radially extending surface of these disc members and which lands engage the radially extending surface of the adjacent drive member 56. The interposed drive or disc members 56 are made of a material of low surface shear and preferably are made of an asbestos material, while other materials may be used, for example copper. The asbestos and steel materials of which the alternate discs of the friction clutch 13a are made provide for a rising coefficient of friction at low slip speeds between the adjacent discs.

Figure 6:
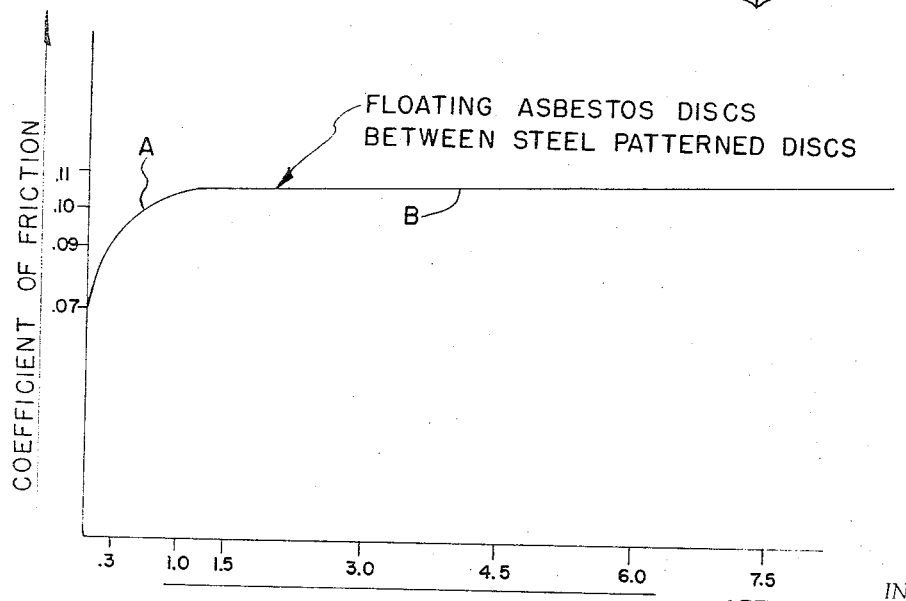
FIG. 6 is a graph illustrating certain characteristics of the mechanism embodying the present invention.

Referring to FIG. 6, the graph illustrates the rising coefficient of friction which is provided by the asbestos drive members which are interposed between the patterned steel friction disc members 54, 55. The graph shows how the coefficient of friction varies as the disc sliding speed varies. It can be seen from this graph that, as the disc sliding speed increases, the coefficient of friction between the steel patterned discs and the asbestos discs increases. At relatively low disc sliding speeds, the rate of increase of the coefficient of friction is extremely great as indicated by the portion of the curve designated A. As the slip speed between the disc members increases, the coefficient of friction increases at a much slower rate, as indicated by the portion of the curve designated B. It can be seen, therefore, that the provision of asbestos floating discs interposed between the steel patterned discs provides for an increase in coefficient of friction between the disc members and, thus, minimizes or drastically reduces chatter between adjacent friction disc members at low slip speeds.

The present invention has been described hereinabove in considerable detail and certain modifications, changes and adaptations may be made therein without departing from the scope of the present invention and it is hereby intended to cover all such modifications, changes, and adaptations which fall within the scope of the appended claims.

Having described our invention, we claim:

1. In a differential gear mechanism, a rotatable casing having a rigid wall carrying an annular thrust portion, a gear train comprising gears rotatable in the casing with the teeth of adjacent gears in meshed engagement, one of said gears comprising a rigid body having an annular thrust portion in a substantially opposed relation to the thrust portion of said casing, said one gear being axially loaded in response to a clutch actuating force produced by the pressure angle torque load reaction between the meshed teeth, pressure-responsive friction clutch means disposed between said thrust portions for retarding rotation of said one gear relative to said casing including a first steel friction disc having a plurality of lands and grooves on a radial face thereof and drivingly connected to said one gear, a second steel friction disc having a plurality of lands and grooves on a radial face thereof and drivingly connected to said casing and disposed adjacent said first friction disc, and a friction drive member of asbestos material positioned between said first and second friction discs having radially extending surfaces engageable with said radially extending faces of said friction discs and drivingly interconnecting said first and second friction discs and having a friction drive engagement with at least one of said friction discs so as to drivingly interconnect said first and second friction discs.

2. In a differential gear mechanism, a rotatable casing having a rigid wall carrying an annular thrust portion, a gear train comprising gears rotatable in the casing with the teeth of adjacent gears in meshed engagement, one of said gears comprising a rigid body having an annular thrust portion in a substantially opposed relation to the thrust portion of said casing, said one gear being axially loaded in response to a clutch actuating force produced by the pressure angle torque load reaction between the meshed teeth, pressure-responsive friction clutch means disposed between said thrust portions for retarding rotation of said one gear relative to the casing including a first steel friction disc drivingly connected to said one gear, a second steel friction disc drivingly connected to said casing, and a floating friction drive disc of asbestos material disposed between said first and second friction discs, said first and second friction discs and said drive dics having surfaces in continuous pressure engagement and with said pressure of engagement therebetween increasing when said one gear is axially loaded, said drive disc having a frictional drive connection with said first and second friction discs upon axial loading of said gear so as to drivingly interconnect said first and second friction discs, said first and second friction discs having radially extending surfaces, and said radially extending surfaces being patterned and having a plurality of projections formed therein which are engageable with said floating asbestos disc.

3. In a differential drive mechanism having a casing and a differential gear mechanism carried by the casing, a friction clutch mechanism actuated by the differential gear mechanism and operable to retard rotation of one of the differential gears relative to said casing, said friction clutch including a first friction disc drivingly connected with said one gear, a second friction disc drivingly connected with said casing, a floating friction drive member disposed between said first and second friction discs and having a frictional drive connection with said first and second friction discs upon actuation of said friction clutch so as to frictionally drivingly interconnect said first and second friction discs, said first and second friction discs having a plurality of land portions defined by groove portions and located on opposed radial faces thereof with said land portions on each of said discs engageable with said floating friction drive member, and said floating friction drive member being made of asbestos material.

4. In a differential drive mechanism having a casing and a differential gear mechanism carried by the casing, a friction clutch mechanism actuated by the differential gear mechanism and operable to retard rotation of one of the differential gears relative to said casing, said friction clutch including a first friction disc drivingly connected with said one gear, a second friction disc drivingly connected with said casing, a floating friction drive member disposed between said first and second friction discs and having a frictional drive connection with said first and second friction discs upon actuation of said friction clutch so as to frictionally drivingly interconnect said first and second friction discs, and said first and second friction discs having a plurality of land portions defined by groove portions and located on opposed radial faces thereof with said land portions on each of said discs engageable with said floating friction drive member.

References Cited by the Examiner

UNITED STATES PATENTS

| 1,481,889 | 1/1924 | Carhart | 74—711 X |
|-----------|--------|---------|----------|
| 1,665,554 | 4/1928 | Kolb | 192—107 X |
| 1,700,860 | 2/1929 | Snell | 192—107 X |
| 3,052,137 | 9/1962 | Russell | 74—710.5 |
| 3,073,424 | 1/1963 | Russell | 192—107 X |
| 3,208,306 | 9/1965 | Lewis | 74—711 |

FOREIGN PATENTS 878,077  9/1961  Great Britain.

DAVID J. WILLIAMOWSKY, *Primary Examiner.*

J. A. WONG, *Assistant Examiner.*